US012581011B2

(12) United States Patent
Cha et al.

(10) Patent No.: US 12,581,011 B2
(45) Date of Patent: Mar. 17, 2026

(54) USER INTERFACE TO SELECT OR CHANGE CAPTION LANGUAGE FOR CAPTIONED TELEPHONE SERVICE SYSTEM

(71) Applicant: Mezmo Corporation, Buena Park, CA (US)

(72) Inventors: Wonjae Cha, Irvine, CA (US); Haesung Lee, Irvine, CA (US); John Lee, Irvine, CA (US)

(73) Assignee: Mezmo Corporation, Irvine, CA (US)

( * ) Notice: Subject to any disclaimer, the term of this patent is extended or adjusted under 35 U.S.C. 154(b) by 210 days.

(21) Appl. No.: 18/397,865

(22) Filed: Dec. 27, 2023

(65) Prior Publication Data

US 2025/0220112 A1      Jul. 3, 2025

(51) Int. Cl.
  *H04M 1/72478*      (2021.01)
  *G06F 9/451*        (2018.01)
  *G10L 15/00*        (2013.01)
  *G10L 15/26*        (2006.01)
(52) U.S. Cl.
  CPC ........ *H04M 1/72478* (2021.01); *G06F 9/454* (2018.02); *G10L 15/005* (2013.01); *G10L 15/26* (2013.01)
(58) Field of Classification Search
  CPC . H04M 1/72478; H04M 1/2475; G06F 9/454; G10L 15/005; G10L 15/26
  See application file for complete search history.

(56) References Cited

U.S. PATENT DOCUMENTS

| | | | | |
|---|---|---|---|---|
| 7,466,801 | B2 * | 12/2008 | Miller | H04Q 3/74 |
| | | | | 379/142.01 |
| 8,069,030 | B2 * | 11/2011 | Iso-Sipila | H04M 1/72448 |
| | | | | 455/433 |
| 9,600,474 | B2 * | 3/2017 | Cuthbert | G10L 25/48 |
| 11,539,900 | B2 * | 12/2022 | Engelke | H04N 21/4884 |
| 11,909,911 | B2 * | 2/2024 | Lee | H04M 3/42391 |
| 11,962,716 | B2 * | 4/2024 | Patron | H04M 3/42382 |
| 12,293,161 | B2 * | 5/2025 | Moy | G06F 40/58 |
| 2005/0091274 | A1 * | 4/2005 | Stanford | G06F 16/9577 |
| 2020/0057812 | A1 * | 2/2020 | Zhao | G06F 40/58 |
| 2022/0286310 | A1 * | 9/2022 | Rathnam | G06F 3/0482 |
| 2023/0402033 | A1 * | 12/2023 | Heinzmann | G10L 15/22 |
| 2024/0308252 | A1 * | 9/2024 | Engelke | B41J 11/663 |
| 2025/0142168 | A1 * | 5/2025 | Shetty | G10L 17/00 |
| 2025/0260789 | A1 * | 8/2025 | Chang | H04N 21/4884 |

* cited by examiner

*Primary Examiner* — Lisa Hashem
(74) *Attorney, Agent, or Firm* — Heedong Chae; Lucem, PC

(57)      ABSTRACT

A Captioned Telephone Service ("CTS") system, equipped with a CTS application, offers several user interfaces. These interfaces are designed to set the primary and secondary languages of the user, as well as the caption language of a contact. This configuration ensures that the caption language of a phone call matches the caption language assigned to the contact if the call is made with that contact. Additionally, if the caption language during a phone call is found to be incorrect, the system allows for a swift change to another language. This could be either the primary or secondary language of the user, or a completely different language, as required during the call.

20 Claims, 3 Drawing Sheets

100

100

100

USER INTERFACE TO SELECT OR CHANGE CAPTION LANGUAGE FOR CAPTIONED TELEPHONE SERVICE SYSTEM

FIELD OF THE INVENTION

The present invention relates to a captioned telephone service ("CTS") system designed for users who are deaf or hard-of-hearing ("DHH"). The CTS application of the CTS system provides a number of user interfaces configured to set the primary and secondary languages of the user and the caption language of a contact. This enables the caption language of a phone call to match the contact's caption language or to be quickly changed to another language, such as the user's primary or secondary language, during the call if necessary.

BACKGROUND OF THE INVENTION

A Captioned Telephone Service ("CTS"), also known as a transcription service, assists individuals, especially those who are deaf or hard of hearing ("DHH") but can speak, in making phone calls. In CTS, a DHH user's phone call with another party (the "peer"), who may or may not be DHH, involves transcribing the peer's spoken words into text. This transcription, performed by either a human operator ("call agent") or an Automatic Speech Recognition ("ASR") engine, is sent to the user's device for display as texts.

The user's device could be a personal communication device like a mobile phone, smartphone, landline, or a terminal provided by a CTS provider. The CTS application on their device enables them to make or receive calls and access transcription services from a CTS server connected to a call agent or ASR engine.

In countries or locales with a single common language, the transcription into text is straightforward, as the incoming and outgoing calls predominantly use that language. However, in multilingual regions, the need to switch call agents or ASR engines arises if the first one engaged is not fluent in the peer's language. With the advancement of ASR technology, supporting multiple languages has become more common. Yet, hearing-impaired individuals in multilingual countries, especially immigrants, might face challenges with CTS services that do not support their native languages. The inconvenience is compounded when users are required to select their preferred language for each call from an extensive list of languages within the CTS application. For example, if the caption language of a phone call is incorrect, the time taken for a user to select a new caption language from a long list of languages can be significant. Additionally, the DHH user may need to request a switch to a call agent fluent in the peer's language, leading to delays and bottlenecks during the phone call, causing inconvenience to both the DHH user and the peer. These inefficiencies highlight the limitations of typical Telecommunications Relay Services for hearing-impaired users.

Although some CTS systems employ language detection methods, these can be slow and sometimes inaccurate in identifying the peer's spoken language.

Therefore, to solve the above problems, a CTS system and application are provided, offering user interfaces for setting caption languages and quickly switching caption languages during a phone call. This system aims to reduce time spent identifying a caption language and allows for a quick change if the selected language is incorrect, fulfilling the need for an efficient system and method to accomplish this goal.

This invention is directed to solve these problems and satisfy the long-felt need.

SUMMARY OF THE INVENTION

The present invention contrives to solve the disadvantages of the prior art. The present invention provides a CTS system and a user application for a user who is DHH. The CTS application offers a number of user interfaces. These interfaces are designed to set the primary and secondary languages of the user, and the caption language of a contact such that the caption language of a phone call becomes the caption language of the contact if the phone call is with the contact. Additionally, if the caption language of the phone call is incorrect, it can be swiftly changed to another language, such as the primary language or secondary language of the user, or another language, during the phone call.

The object of the present invention is to provide a CTS system that includes an electronic device of the user, a CTS application, and a CTS server for delivering caption services during a phone call between the user and a peer associated with a contact. The CTS server is linked to a plurality of ASR engines or call agents, each capable of transcribing in a specific language. The CTS application is configured to display a first user interface for setting the caption language for the user, and a second user interface that allows the user to switch a caption language of the phone call during the phone call between the user and the peer while receiving the caption service. The first user interface includes options for selecting a primary language of the user and selecting a secondary language of the user, and the second user interface features a window for switching the caption language of the phone call to another language. Upon the user's switching of the caption language of the phone call to a new language, the CTS application sends a request to the CTS server to change a current ASR engine or call agent to another ASR engine or call agent capable of transcribing the new language. Preferably, the second user interface displays the primary language of the user or the secondary language of the user, or both, for a quick selection.

Furthermore, the CTS application is configured to display a third user interface for setting a caption language of a contact associated with the peer. The third user interface includes an option for selecting the caption language of the contact. During a phone call between the user and the peer associated with the contact, the caption language of the contact will become the caption language of the phone call. If the caption language is incorrect, the user can change it using the second user interface, and there is an option to update the caption language of the contact during or after the phone call. The second user interface may list the primary language of the user or the secondary language of the user or both before other languages for quicker selection than the other languages.

Additionally, the CTS application is configured to display a fourth user interface for selecting a language. The fourth user interface includes a window for a language selection which lists a plurality of languages for selection. The fourth user interface is displayed when the user chooses the primary language or the secondary languages of the user in the first user interface, selects "other" language in the second user interface, or sets the caption language of the contact in the third user interface. The plurality of languages may be listed and organized with pinned languages first, followed by unpinned languages, and this interface allows the user to toggle or switch between pinned and unpinned languages and to rearrange their order.

Another object of the present invention is to provide an electronic device that includes a phone number assigned from a carrier, a display, a memory storing a contact, and a CTS application installed on the electronic device. The CTS application is configured to display a first user interface for setting a caption language for the user, and the first user interface includes selecting a primary language of the user and selecting a secondary language of the user. Furthermore, the CTS application is configured to display a second user interface that enables the user to switch the caption language of the phone call during the phone call between the user and the peer while receiving the caption service. The second user interface includes a window to switch the caption language of the phone call to a different language. In response to the user switching the caption language of the phone call to the new language, the CTS application sends a request to the CTS server to switch from the current ASR engine or call agent to another ASR engine or call agent, who is capable of transcribing in the new language.

Additionally, the CTS application is configured to display a third user interface for setting the caption language of the contact. This interface includes selecting the caption language of the contact such that the caption language of the contact becomes the default caption language of the phone call with the peer associated with the contact. Moreover, the CTS application is configured to display a fourth user interface for selecting a language. This fourth user interface includes a window for a language selection which lists a plurality of languages for selection. The fourth user interface is displayed when the user selects the primary language or the secondary languages of the user in the first user interface, an "other" language in the second user interface, or the caption language of the contact in the third user interface.

The advantages of the present invention are: (1) the present invention allows users to pre-register their native language as a secondary language in the application's setting, making it easy to switch between the primary Language (the official language of the country where the user's phone number is registered) and the secondary language (the user's native language); (2) independent of the primary and secondary languages of the users, users can pre-set the language to be used with each contact in their contact list, facilitating captioning services in the predetermined language without the need for user intervention during a phone call; (3) if the user is communicating with a contact for the first time, the system can automatically recognize the contact's language and recommend it to the user for saving in their contact information; (4) if a language different from the one saved in the contact is detected during a phone call, the CTS application prompts the user to decide whether to update the contact's information with the newly recognized language; (5) the CTS application of the present invention provides user interfaces that allow users to set primary and secondary languages of the user and the caption language for each contact, ensuring that a phone call with a peer associated with the contact is transcribed in the caption language stored in the contact, and if no caption language is stored, the phone call may be transcribed in either the primary language or secondary language or a language identified by a language detection module; and (6) the CTS application of the present invention provides user interfaces for quickly changing the caption language of a phone call to the primary or secondary language of the user or another language during the phone call.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
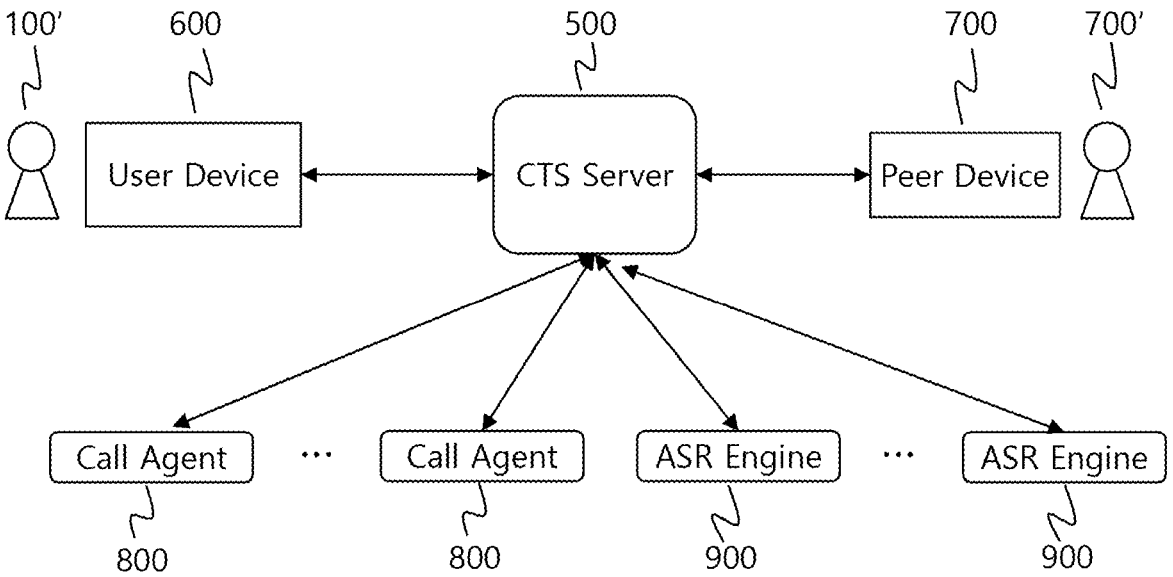
FIG. 1 shows a schematic diagram of the CTS system according to the present invention.

FIG. 1 shows a schematic diagram of the CTS system according to the present invention. FIGS. 2-5 respectively show schematic diagrams of the display of the CTS application 100, each illustrating the first user interface (FIG. 2), the third user interface (FIG. 3), the second user interface (FIG. 4), and the fourth user interface (FIG. 5) according to the present invention.

As shown in FIG. 1, the CTS system of the present invention includes an electronic device 600 of a user 100', a CTS application 100, and a CTS server 500. This server provides a caption service to the user 100' during a phone call between the user 100' and a peer 700' associated with a contact 200. The phone call is facilitated between the user device 600 and the peer device 700 through the CTS server 500. The CTS server 500 is connected to a plurality of automatic speech recognition ("ASR") engines 900 and/or call agents 800, each capable of transcribing a specific language.

The electronic device 600 of the user 100', namely, the user device 600, includes a phone number assigned by a carrier and a display and stores the contact 200 of the peer. The CTS application 100, installed on the electronic device 600 of the user 100', enables the CTS server 500 to provide caption services to the user during a phone call between the user 100' and a peer 700' associated with the contact 200.

The CTS application 100 is connected to the CTS server 500, which transcribes and converts a peer's voice into caption data and transmits the caption data to the CTS application 100 during the phone call between the user 100' and the peer 700'.

Figure 2:
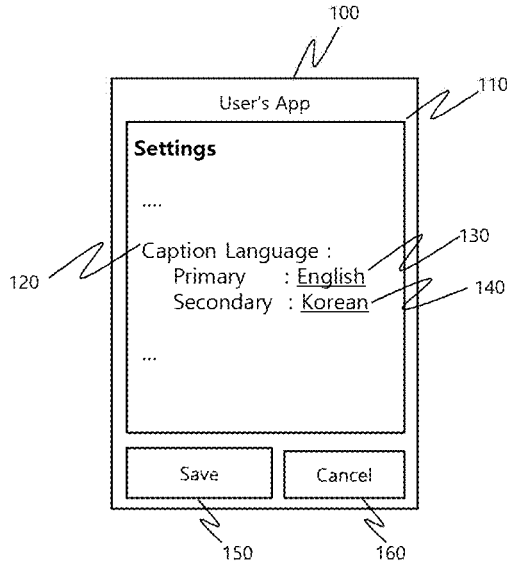
FIG. 2 shows a schematic diagram of the display of the CTS application showing the first user interface according to the present invention.
Figure 4:
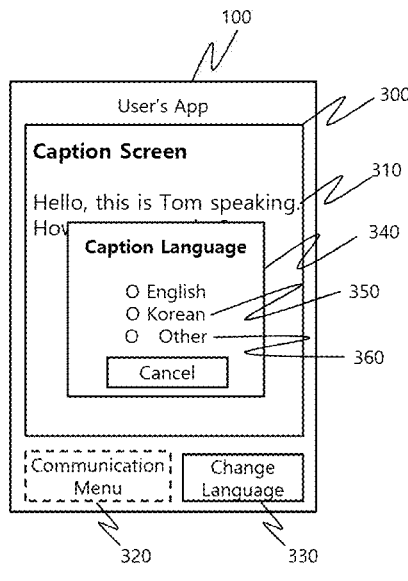
FIG. 4 shows a schematic diagram of the display of the CTS application showing the second user interface according to the present invention.

The CTS application 100 is configured to display a first user interface for setting a caption language 120 for the user 100', as shown in FIG. 2, and a second user interface for allowing the user 100' to switch the caption language 340 of the phone call during the phone call between the user 100' and the peer 700' while receiving the caption service, as shown in FIG. 4. The first user interface allows the selection of a primary language 130 of the user 100' and a secondary language 140 of the user 100', and the second user interface includes a window 340 to switch the caption language of the phone call to a different language. Upon the user switching the caption language 340 of the phone call to another language, the CTS application 100 sends a request to the CTS server 500 to change the current ASR engine or call agent 900, 800 to another ASR engine or call agent 900, 800, who is capable of transcribing the said another language.

Figure 5:
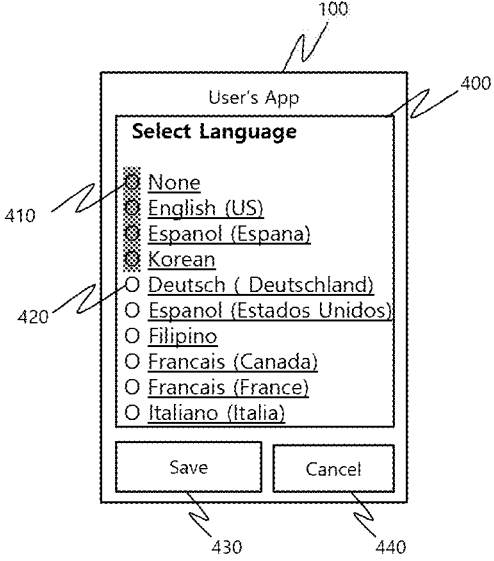
FIG. 5 shows a schematic diagram of the display of the CTS application showing the fourth user interface according to the present invention.

FIG. 2 shows a screen or window 110 for app setting of the CTS application 100, which includes the first user interface for setting the caption language of the user 100' comprised of primary language 130 and secondary language 140. Selecting either primary or secondary language 130, 140 brings up a "select language" window, as shown in FIG. 5, for a language selection. Here, a user 100' may set the official language of the country associated with the user's phone number as primary language 130 and his native language as secondary language, or vice versa. The screen for app setting also includes "save" and "cancel" button 150, 160 to save or cancel the language selection(s).

During a phone call, if the user 100' finds the caption language of the phone call incorrect, he can switch the caption language during the phone call using the second user interface. The second user interface also includes a "change language" button 330, and if the "change language" button 330 is selected, the window 340 to switch the caption language 340 of the phone call is displayed. The second user interface displays either or both the primary language 130 of the user 100' and the secondary language 140 of the user 100'.

FIG. 4 shows a live captioning screen or caption language dialogue during the phone call. The caption screen 300 displays caption text converted from the peer's spoken words. Selecting the "change language" button 330 brings up the window 340 for the second user interface, enabling the switch of the caption language of the phone call. Alternatively, the window 340 may be automatically appear if the CTS system detects that the caption language is incorrect. In addition, the screen of FIG. 4 shows the communication menu 320, which may include additional features supported by the CTS application 100 during the phone call, such as voice mute, output device change, call end, DTMF (Dual-Tone Multi-Frequency) generator, or other settings.

The window 340 may list the primary language 130 of the user 100', the secondary language 140 of the user 100', and an "other" language option to select another language from the list shown in FIG. 5. The current caption language of the phone call may be pre-selected in the form of a radio button as a default value, allowing the user 100' to select another language if necessary.

Figure 3:
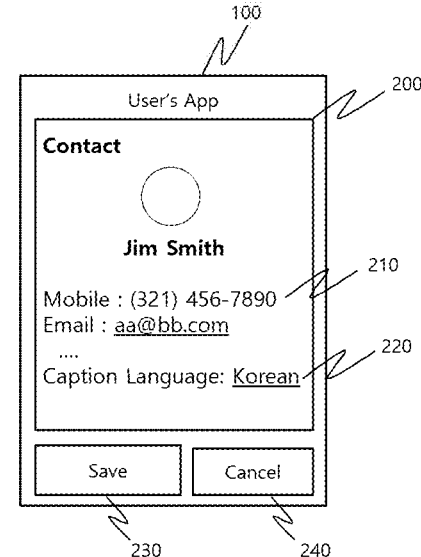
FIG. 3 shows a schematic diagram of the display of the CTS application showing the third user interface according to the present invention.

The CTS application 100 is further configured to display a third user interface, as shown in FIG. 3, for setting a caption language 220 of the contact 200 associated with the peer 700'. As shown in FIG. 3, the third user interface includes options for selecting the caption language 220 of the contact 200.

FIG. 3 shows the screen 200 for a contact, showing information such as phone number, email, address, notes, etc. This screen 200 may include "save" 230 and "cancel" 240 buttons, and the CTS application 100 may feature an auto-save function. During a phone call between the user and the peer associated with the contact, the caption language 220 of the contact becomes the default caption language of the phone call. If incorrect, the user can change it using the second user interface as shown in FIG. 4, with an option to update the caption language of the contact during or after the phone call. The second user interface may list the primary language 130 of the user 100' or the secondary language 140 of the user 100' or both (as shown in FIG. 4). In addition, if caption language 220 is selected, select language screen 400, as shown in FIG. 5, is displayed.

The CTS application 100 is also configured to display a fourth user interface (see FIG. 5) for selecting a language. The fourth user interface includes a window 400 for a language selection which lists a plurality of languages for selection. The fourth user interface is activated when the user 100' selects the primary language 130 or the secondary language 140 of the user 100' in the first user interface (FIG. 2), the "other" language 360 in the second user interface (FIG. 4), or the caption language 220 of the contact 200 in the third user interface (FIG. 3).

As shown in FIG. 5, the plurality of languages is listed in the order of pinned languages first 410, followed by unpinned languages 420. The fourth user interface is configured to enable the user 100' to switch between pinned languages 410 and unpinned languages 420 and to rearrange the order of the plurality of languages. FIG. 5 shows the buttons for "save" 430 and "cancel" 440. Pinned languages are a list of frequently used languages, and users may rearrange its order. Un-pinned languages are a list of other languages and may be listed alphabetically.

The plurality of languages may be listed in the order of the primary language 140 of the user 100', followed by the secondary language 140' of the user 100', and then, according to the number of caption languages 220 for the contacts 200. The greater the number of caption languages 200, the earlier they are listed.

In one embodiment, during the phone call between the user 100' and the peer 700', the CTS server 500 is configured to transcribe the peer's voice in the caption language 220 of the contact 200. If no caption language 220 of the contact 200 is saved, the CTS server 500 is configured to transcribe the peer's voice in the primary language 130 of the user 100' or the secondary language 140 of the user 100'.

The CTS server 500 may also include a language detection module which is configured to identify the spoken language of the peer 700' during the phone call between the user 100' and the peer 700'. If the caption language 220 of the contact 200 is saved for the contact 200, the CTS server 500 will transcribe the peer's voice in the caption language 220 of the contact 200 during the phone call between the user 100' and the contact 700'. However, if no caption language 220 of the contact 200 is saved for the contact 200, the language detection module is configured to perform to identify the spoken language of the peer 700', and the CTS server 500 will transcribe the peer's voice in the identified spoken language of the peer 700' during the phone call between the user 100' and the peer 700'. Moreover, if no caption language 220 of the contact 200 is saved for the contact 200 and the language detection module identifies the spoken language of the contact 200, the CTS application 100 is configured to display a window to ask the user whether to save the identified spoken language of the contact as the caption language of the contact 200 during or after the phone call.

If the caption language 220 of the contact 200 is saved for the contact 200, the CTS server 500 transcribes the peer's voice in the caption language 220 of the contact 200 during the phone call between the user 100' and the peer 700'. Concurrently, the language detection module is configured to perform to identify the spoken language of the peer. If the identified spoken language of the peer 700' is different from the saved caption language 220 of the contact 200, the CTS application 100 displays a window to ask the user 100' whether to switch the caption language of the phone call to the identified spoken language of the peer 700'. In addition, the CTS application 100 is configured to display a window to ask the user whether to update the caption language 220 of the contact 200 to the identified spoken language of the peer 700' during or after the phone call.

The phone number of the user 100' is associated with a country, and the primary language 130 of the user 100' may be set by default to the national language of the country. If there are multiple national languages, these languages are displayed based on population size of each language speaker. The user has the flexibility to reorder these languages as per their preference.

In the alternative embodiment, an electronic device 600 of the present invention for a CTS user 100' includes a phone number assigned from a carrier, a display, a memory storing a contact, and a CTS application 100 installed on the electronic device 600. The CTS application 100 is connected to a CTS server 500 for providing a caption service to the user 100' during a phone call between the user 100' and a peer 700' associated with the contact, and the CTS server 500 transcribes and converts a peer's voice into caption data and transmits the caption data to the CTS application 100 during the phone call between the user 100' and the peer 700'. The CTS server 500 is connected to a plurality of ASR engines 900 or call agents 800, each of which is capable of transcribing a certain language.

The CTS application 100 is configured to display a first user interface for setting a caption language 120 for the user 100', and the first user interface includes selecting a primary language 130 of the user 100' and selecting a secondary language 140 of the user 100'. The CTS application 100 is further configured to display a second user interface for enabling the user 100' to switch a caption language of the phone call during the phone call between the user 100' and the peer 700' while receiving the caption service, and the second user interface includes a window 340 to switch the caption language of the phone call to another language. In addition, in response to the user's switching of the caption language of the phone call to the said another language, the CTS application 100 sends a request to the CTS server 500 to change a current ASR engine 900 or call agent 800 to another ASR engine 900 or call agent 800, who is capable of transcribing the said another language.

The second user interface further includes a change language button 660, and if the change language button 330 is selected, the window 340 to switch the caption language of the phone call is displayed. The second user interface displays the primary language 130 of the user 100' or the secondary language 140 of the user 100', or both.

The CTS application 100 is further configured to display a third user interface and set a caption language 220 of the contact 200, wherein the third user interface includes selecting the caption language 220 of the contact 200.

The CTS application 100 is further configured to display a fourth user interface and select a language, and the fourth user interface includes a window for a language selection which lists a plurality of languages for selection. The fourth user interface is displayed when the user selects the primary language 130 or the secondary languages 140 of the user 100' in the first user interface, other language 360 in the second user interface, or the caption language 220 of the contact 200 in the third user interface.

The plurality of languages is listed in the order of pinned languages 410 first, followed by unpinned languages 420, and the fourth user interface is configured to enable the user 100' to switch between pinned languages 410 and unpinned languages 420 and to rearrange the order of the plurality of languages.

During the phone call between the user 100' and the peer 700', the CTS server 500 is configured to transcribe the peer's voice in the caption language of the contact, and if no caption language 220 of the contact 200 is saved, the CTS server 500 is configured to transcribe the peer's voice in the primary language 130 of the user 100' or the secondary language 140 of the user 100'.

The CTS server 500 includes a language detection module which is configured to identify a spoken language of the peer 700' during the phone call between the user 100' and the peer 700'. If the caption language 220 of the contact 200 is saved, the CTS server 500 is configured to transcribe the peer's voice in the caption language 220 of the contact 200 during the phone call between the user 100' and the contact 700'. If no caption language 220 of the contact 200 is saved, the language detection module is configured to perform to identify the spoken language of the peer 700' and the CTS server 500 is configured to transcribe the peer's voice in the identified spoken language of the peer during the phone call between the user 100' and the peer 700'. In addition, if no caption language 220 of the contact 200 is saved and the language detection module identifies the spoken language of the contact, the CTS application 100 is configured to display a window to ask the user whether to save the identified spoken language of the contact as the caption language 220 of the contact 200 during or after the phone call.

The CTS server 500 includes a language detection module which is configured to identify a spoken language of the peer during the phone call between the user 100' and the peer 700'. If the caption language 220 of the contact 200 is saved, the CTS server 500 is configured to transcribe the peer's voice in the caption language 220 of the contact 200 during the phone call between the user 100' and the peer 700' and the language detection module is configured to perform to identify the spoken language of the peer. If the identified spoken language of the peer is different from the caption language 220 of the contact 200, the CTS application 100 displays a window to switch the caption language of the phone call to the identified spoken language of the peer. The CTS application 100 is configured to display a window to ask the user whether to update the caption language 220 of the contact 200 to the identified spoken language of the peer.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A captioned telephone service ("CTS") system, comprising:

an electronic device of a user which includes a phone number assigned from a carrier, wherein the electronic device of the user includes a display and stores a contact;

a CTS application installed on the electronic device of the user; and a CTS server for providing a caption service to the user during a phone call between the user and a peer associated with the contact, wherein the CTS application is connected to the CTS server which transcribes and converts a peer's voice into caption data and transmits the caption data to the CTS application during the phone call between the user and the peer, wherein the CTS server is connected to a plurality of automatic speech recognition ("ASR") engines or call agents, each of which is capable of transcribing a certain language, wherein the CTS application is configured to:

display a first user interface and set a caption language for the user, wherein the first user interface includes selecting a primary language of the user and selecting a secondary language of the user; and display a second user interface and enable the user to switch a caption language of the phone call from a first language during the phone call between the user and the peer while receiving the caption service for transcribing and converting the peer's voice into caption data in the first language, wherein the second user interface includes a window to switch the caption language of the phone call from the first language to a second language for transcribing and converting the peer's voice into caption data in the second language, wherein in response to the user's switching of the caption language of the phone call from the first language to the second language, the CTS application sends a request to the CTS server to change a current ASR engine or call agent to another ASR engine or call agent who is capable of transcribing the second language.

2. The CTS system of claim 1, wherein the second user interface further includes a change language button, and wherein if the change language button is selected, the window to switch the caption language of the phone call is displayed, wherein the second user interface displays the primary language of the user or the secondary language of the user, or both.

3. The CTS system of claim 1, wherein the CTS application is further configured to display a third user interface and set a caption language of the contact, wherein the third user interface includes selecting the caption language of the contact.

4. The CTS system of claim 3, wherein the CTS application is further configured to display a fourth user interface and select a language, wherein the fourth user interface includes a window for a language selection which lists a plurality of languages for selection, and wherein the fourth user interface is displayed when the user selects the primary language or the secondary languages of the user in the first user interface, other language in the second user interface, or the caption language of the contact in the third user interface.

5. The CTS system of claim 4, wherein the plurality of languages is listed in the order of pinned languages first, followed by unpinned languages, and wherein the fourth user interface is configured to enable the user to switch between pinned languages and unpinned languages and to rearrange the order of the plurality of languages.

6. The CTS system of claim 4, wherein the plurality of languages is listed in the order of the primary language of the user, followed by the secondary language of the user, and then, according to the number of caption languages for the contacts.

7. The CTS system of claim 1, wherein during the phone call between the user and the peer, the CTS server is configured to transcribe the peer's voice in a caption language of the contact, and if no caption language of the contact is saved, the CTS server is configured to transcribe the peer's voice in the primary language of the user or the secondary language of the user.

8. The CTS system of claim 1, wherein the CTS server includes a language detection module which is configured to identify a spoken language of the peer during the phone call between the user and the peer.

9. The CTS system of claim 8, wherein if the caption language of the contact is saved, the CTS server is configured to transcribe the peer's voice in the caption language of the contact during the phone call between the user and the contact, wherein if no caption language of the contact is saved, the language detection module is configured to perform to identify the spoken language of the peer and the CTS server is configured to transcribe the peer's voice in the identified spoken language of the peer during the phone call between the user and the peer.

10. The CTS system of claim 9, wherein if no caption language of the contact is saved and the language detection module identifies the spoken language of the contact, the CTS application is configured to display a window to ask the user whether to save the identified spoken language of the contact as the caption language of the contact.

11. The CTS system of claim 8, wherein if the caption language of the contact is saved, the CTS server is configured to transcribe the peer's voice in the caption language of the contact during the phone call between the user and the peer and the language detection module is configured to perform to identify the spoken language of the peer, wherein if the identified spoken language of the peer is different from the caption language of the contact, the CTS application displays a window to ask the user whether to switch the caption language of the phone call to the identified spoken language of the peer.

12. The CTS system of claim 11, wherein the CTS application is configured to display a window to ask the user whether to update the caption language of the contact to the identified spoken language of the peer.

13. The CTS system of claim 11, wherein the phone number is associated with a country, wherein the primary language of the user has a default value as a national language of the country.

14. An electronic device for a user of a captioned telephone service ("CTS"), comprising:

a phone number assigned from a carrier;

a display;

a memory storing a contact; and a CTS application installed on the electronic device, wherein the CTS application is connected to a CTS server for providing a caption service to the user during a phone call between the user and a peer associated with the contact, wherein the CTS server transcribes and converts a peer's voice into caption data and transmits the caption data to the CTS application during the phone call between the user and the peer, wherein the CTS server is connected to a plurality of automatic speech recognition ("ASR") engines or call agents, each of which is capable of transcribing a certain language, wherein the CTS application is configured to:

display a first user interface and set a caption language for the user, wherein the first user interface includes selecting a primary language of the user and selecting a secondary language of the user; and display a second user interface and enable the user to switch a caption language of the phone call from a first language during the phone call between the user and the peer while receiving the caption service for transcribing and converting the peer's voice into caption data in the first language, wherein the second user interface includes a window to switch the caption language of the phone call from the first language to a second language for transcribing and converting the peer's voice into caption data in the second language, wherein in response to the user's switching of the caption language of the phone call from the first language to the second language, the CTS application sends a request to the CTS server to change a current ASR engine or call agent to another ASR engine or call agent who is capable of transcribing the second language.

15. The electronic device of claim 14, wherein the second user interface further includes a change language button, and wherein if the change language button is selected, the window to switch the caption language of the phone call is displayed, wherein the second user interface displays the primary language of the user or the secondary language of the user, or both.

16. The electronic device of claim 14, wherein the CTS application is further configured to display a third user interface and set a caption language of the contact, wherein the third user interface includes selecting the caption language of the contact.

17. The electronic device of claim 16, wherein the CTS application is further configured to display a fourth user interface and select a language, wherein the fourth user interface includes a window for a language selection which lists a plurality of languages for selection, and wherein the fourth user interface is displayed when the user selects the primary language or the secondary languages of the user in the first user interface, other language in the second user interface, or the caption language of the contact in the third user interface, wherein the plurality of languages is listed in the order of pinned languages first, followed by unpinned languages, and wherein the fourth user interface is configured to enable the user to switch between pinned languages and unpinned languages and to rearrange the order of the plurality of languages.

18. The electronic device of claim 14, wherein during the phone call between the user and the peer, the CTS server is configured to transcribe the peer's voice in a caption language of the contact, and if no caption language of the contact is saved, the CTS server is configured to transcribe the peer's voice in the primary language of the user or the secondary language of the user.

19. The electronic device of claim 14, wherein the CTS server includes a language detection module which is configured to identify a spoken language of the peer during the phone call between the user and the peer, wherein if the caption language of the contact is saved, the CTS server is configured to transcribe the peer's voice in the caption language of the contact during the phone call between the user and the contact, wherein if no caption language of the contact is saved, the language detection module is configured to perform to identify the spoken language of the peer and the CTS server is configured to transcribe the peer's voice in the identified spoken language of the peer during the phone call between the user and the peer, wherein if no caption language of the contact is saved and the language detection module identifies the spoken language of the contact, the CTS application is configured to display a window to ask the user whether to save the identified spoken language of the contact as the caption language of the contact.

20. The electronic device of claim 14, wherein the CTS server includes a language detection module which is configured to identify a spoken language of the peer during the phone call between the user and the peer, wherein if the caption language of the contact is saved, the CTS server is configured to transcribe the peer's voice in the caption language of the contact during the phone call between the user and the peer and the language detection module is configured to perform to identify the spoken language of the peer, wherein if the identified spoken language of the peer is different from the caption language of the contact, the CTS application displays a window to switch the caption language of the phone call to the identified spoken language of the peer, wherein the CTS application is configured to display a window to ask the user whether to update the caption language of the contact to the identified spoken language of the peer.

* * * * *